UNITED STATES PATENT OFFICE.

FERDINAND FRITSCHE, OF RUMBURG, AUSTRIA-HUNGARY, ASSIGNOR TO THE FIRM OF STOLLE AND KOPKE, OF RUMBURG, AUSTRIA-HUNGARY.

PROCESS FOR THE PRODUCTION OF SOLUBLE STARCH.

No. 910,524.     Specification of Letters Patent.     Patented Jan. 26, 1909.

Application filed January 13, 1908. Serial No. 410,649.

*To all whom it may concern:*

Be it known that I, FERDINAND FRITSCHE, a subject of the Emperor of Austria-Hungary, and resident of Rumburg, in the Empire of Austria-Hungary, have invented a new and useful Process for the Production of Soluble Starch, of which the following is a specification.

This invention relates to a soluble starch and the method of producing the same.

It has already been proposed to manufacture soluble starch by treating the starch with a substance which readily parts with its oxygen. Hitherto the oxygen carriers employed have been persulfates, permanganates and the like. Such substances leave a refuse after reaction which necessitates a very extensive filtering, washing and drying of the mass after reaction.

The object of the present invention is to provide a process which avoids the disadvantages of prior known processes and dispenses with expensive apparatus while saving the time formerly required for after treatment.

The invention consists in treating starch with a perborate for example perborate of sodium. The perborate of sodium is preferable as it is more stable than other perborates *i. e.* it may be kept for some considerable time without undergoing any undesirable change. The invention will be most clearly understood from the following examples of method for carrying the same into practical effect.

*Example 1.*—1 kilogram of perborate of sodium is intimately mixed with 100 kilograms starch in a dry state, water is then added in convenient quantities to produce a pasty mixture and this mixture is heated until the reaction is produced. The completion of the reaction is indicated by the formation of a clear solution. The borax left after the reaction of the perborate has no disadvantageous effect and in fact only amounts to 1% of the solution as used in practice.

*Example 2.*—100 kilograms starch are mixed with 100 kilograms of a 2% solution of perborate of sodium and the mixture is kept at a temperature of 30–40° C. This temperature is maintained for about 5 hours during which time the mixture is kept stirred. After 5 hours the reaction is usually complete.

The dry mixture described in the first example given above may be heated gently, in this case the moisture in the ordinary starch may be sufficient to effect the solution and it is then unnecessary to add water.

It may here be pointed out that an important advantage of the present invention consists in that the dry mixture of starch and sodium perborate is quite stable, that is to say, it does not alter in composition when stored.

I claim:—

1. A soluble starch consisting of a mixture of common starch and perborate of sodium having the property of being soluble in water and of retaining its properties when kept.

2. Process for the production of the soluble starch consisting in mixing common starch with a perborate and heating said mixture, substantially as hereinbefore set forth.

3. A process for the production of the soluble starch in the dry form with a perborate adding water to said mixture and heating said mixture gently, substantially as described.

In witness whereof I have hereunto set my hand in the presence of two witnesses.

FERDINAND FRITSCHE.

Witnesses:
   ADOLF ELGER,
   FRANZ SIMON.